United States Patent [19]
Endo et al.

[11] Patent Number: 5,329,395
[45] Date of Patent: Jul. 12, 1994

[54] OPTICAL ATMOSPHERIC COMMUNICATION SYSTEM

[75] Inventors: Kazuo Endo; Yujiro Ito, both of Kanagawa, Japan

[73] Assignee: Sony Corporation, Japan

[21] Appl. No.: 996,053

[22] Filed: Dec. 23, 1992

[30] Foreign Application Priority Data

Dec. 28, 1991 [JP] Japan ................................ 3-360444

[51] Int. Cl.$^5$ ............................................ H04B 10/10
[52] U.S. Cl. ............................................ 359/159
[58] Field of Search ........................ 359/159, 169, 170

[56] References Cited

U.S. PATENT DOCUMENTS

| | | | |
|---|---|---|---|
| 4,227,261 | 10/1980 | Robertsson | 359/159 |
| 4,823,402 | 4/1989 | Brooks | 359/159 |
| 5,060,304 | 10/1991 | Solinsky | 359/159 |
| 5,065,455 | 11/1991 | Ho | 359/159 |
| 5,221,985 | 6/1993 | Ito | 359/154 |

FOREIGN PATENT DOCUMENTS 1305734 12/1989 Japan .
2276328 11/1990 Japan .

Primary Examiner—Leslie Pascal
Attorney, Agent, or Firm—Ronald P. Kananen

[57] ABSTRACT

In an optical atmospheric communication apparatus for transmitting desired information via an optical beam circulating in the atmosphere, the position of a transmitting object can be easily detected and thus the projecting position of an optical beam can be corrected, even in the case where the optical beam coming from the transmission object cannot be received. The projecting position of the optical beam is displaced within a prescribed range, and the light receiving area of the optical beam reflected at a corner cube reflector is detected in order that the projecting position of the optical beam is corrected based on the centroidal position of the light receiving area.

4 Claims, 6 Drawing Sheets

5,329,395

OPTICAL ATMOSPHERIC COMMUNICATION SYSTEM

BACKGROUND OF THE INVENTION

1. Field of the Invention

This invention relates to an optical atmospheric communication system, and more particularly is suitably applied to a case of transmitting the desired information via a optical beam propagating through the atmosphere.

2. Description of the Prior Art

In a conventional optical atmospheric communication apparatus, a device wherein a part of the optical beam to be outputted to the transmitting object is reflected and can be observed with an observation light to be received from the transmitting object has been proposed (Japanese Patent Applications No. 20916/1990 and No. 138120/1988).

According to this method, the projecting position of the optical beam can be confirmed depending on the optical beam reflected and position of transmitting object can be detected by observing with such as a telescope. The projecting position of the optical beam can be easily adjusted depending on the observation result.

Furthermore, after setting up the optical atmospheric communication apparatus receives the optical beam coming from the transmitting object by the position detecting sensor and thus detects the position of transmitting object.

Moreover, in the optical atmospheric communication apparatus, the reflected optical beam is received by the position detecting sensor and thus the projecting position of optical beam is detected.

With this arrangement, the projecting position of the optical beam is corrected in order that the position of the transmitting object coincides with the projecting position of the optical beam, and in the case where the optical atmospheric communication apparatus vibrates such as by wind, the optical beam can irradiate correctly the transmitting object (U.S. patent application Ser. No. 5,221,985).

Then, in this type of optical atmospheric communication apparatus, while the optical beam of transmitting object can be received, the projecting position of the optical beam can be corrected based on the optical beam.

Accordingly, in the optical atmospheric communication apparatus, while one side of the optical beam irradiates the other side of optical atmospheric communication apparatus, the projecting position of the optical beams can be corrected reciprocally and the information can be sent and received steadily.

However, in this type of optical atmospheric communication apparatus, if both beams discontinue irradiating the opposite transmitting objects, the position of the transmitting object can no longer be detected.

Therefore, in this type of optical atmospheric communication apparatus, there is a negative point wherein the projecting position of the optical beam cannot be corrected and, the projecting position adjusting work of the initial set up stage must be repeated.

Practically, the optical atmospheric communication apparatus vibrates for various reasons in the case where it is set up in the outdoors. There are occasions when the apparatus become incapable of irradiating the opposite transmitting objects with each other.

In this case, if the projecting position can be adjusted automatically, a complicated adjusting work can be omitted and thus the usability of this type of optical atmospheric communication apparatus can be improved.

Moreover, since the optical atmospheric communication apparatus can be set up in the places where the shocks are so severe that apparatuses are usually unable to irradiate the opposite transmitting objects frequently, the places for setting up the optical atmospheric communication apparatus can be expanded.

SUMMARY OF THE INVENTION

In view of the foregoing, an object of this invention is to provide an optical atmospheric communication apparatus capable of correcting the projecting position of optical beams by detecting the position of a transmitting object easily in the case where the optical beam coming from the transmitting object can no longer be received.

According to the present invention, by displacing the projecting position of an optical beam within a prescribed range and detecting a light receiving area of the optical beam and detecting the centroidal position of the light receiving area, the position of the transmitting object can be detected easily and certainly.

Thus, by irradiating the optical beam to the transmitting object based on the detected result thereof, the optical atmospheric communication apparatus capable of detecting the position of transmitting object easily and correcting the projecting position of optical beam can be obtained even in the case where the optical beam coming from the transmitting object is not received.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

Construction of Embodiments

Figure 1:
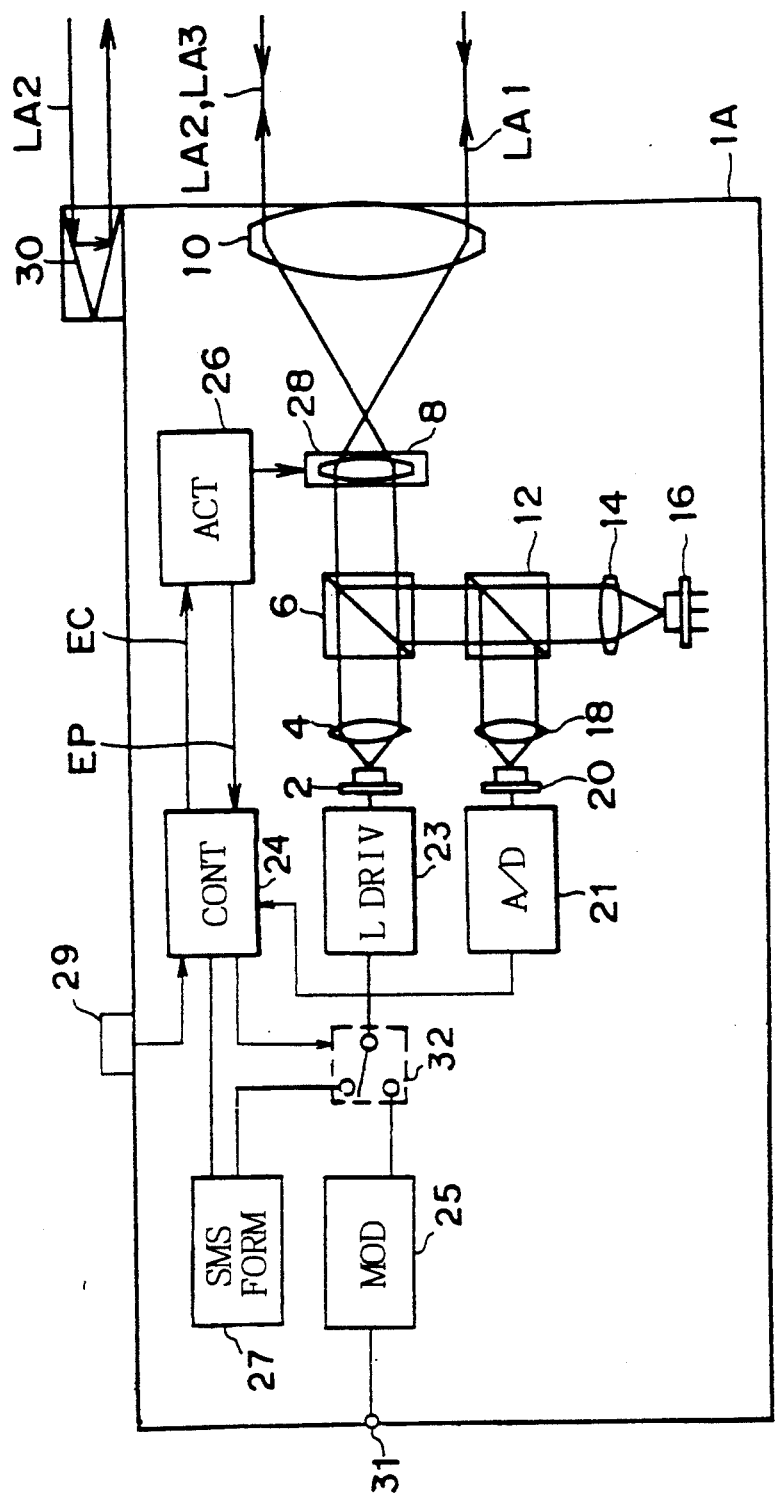
FIG. 1 is a schematic diagram illustrating an optical atmospheric communication apparatus according to one embodiment of the present invention.

In FIG. 1, the reference number 1A generally designates an optical atmospheric communication apparatus.

An information signal, which is provided from an information signal input terminal 31, is provided to a semiconductor laser 2, after modulating to a signal adapted to an optical atmospheric transmission. The semiconductor laser 2 radiates an optical beam LA1 from a predetermined plane of polarization.

Furthermore, in the optical atmospheric communication apparatus 1A, after the optical beam LA1 is converted to parallel light at a lens 4, which is led to a lens 8 via a polarization beam splitter 6, the optical beam LA1 will be outputted to the transmitting object via a lens 10.

Thus, in the optical atmospheric communication apparatus 1A, the optical beam LA1 is converted by the prescribed information signal and the information signal will be outputted to the transmitting object.

Furthermore, in the optical atmospheric communication apparatus 1A, the receiving optical beam LA2 coming from the transmitting object is received at the lens 10 and the receiving optical beam LA2 is led to the polarization beam splitter 6 via a lens 8.

At this point, the optical atmospheric communication apparatus 1A, after reflecting the receiving optical beam LA2, leads to a lens 14 via a beam splitter 12 and receives the transmitting light of the lens 14 at a light detecting element 16.

Hence, in the optical atmospheric communication apparatus 1A, an output signal of the light detecting element 16 is demodulated and the information signal outputted from the transmitting object can be received.

Figure 2:
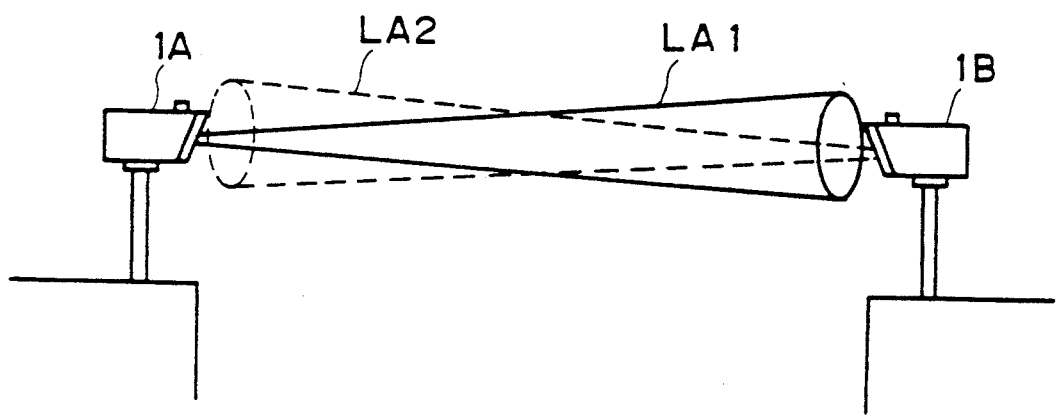
FIG. 2 is a schematic diagram illustrating the operation of a communication condition.

With this arrangement, as shown in FIG. 2, in the optical atmospheric communication apparatus 1A, the optical beams LA1 and LA2 are transmitted and received reciprocally to and from the opposite transmitting object 1B (comprising an identical construction with the optical atmospheric communication apparatus 1A) and the desired information signal can be transmitted.

Thus, in case of transmitting the information signal, the optical atmospheric communication apparatus 1A, after separating a part of the receiving optical beam LA2 at the beam splitter 12, leads to a position detection element 20 via a lens 18.

The output signal of the position detecting sensor 20 is inputted to the control circuit 24, after conversion into a digital signal by an analog/digital converter 21. In the control circuit 24, the receiving position of the received optical beam LA2 corresponding to a projecting position of the optical beam LA1, which is detected according to the output signal based on the analog/digital converter 21.

Further, the control circuit 24 outputs a driving signal EC to an actuator 26 depending on the detected result of the receiving position of the received optical beam LA2 while monitoring a position detection signal EP outputted from the actuator 26, and thus, varies the lens 8 up and down as well as right and left in order that the projecting position of the optical beam LA1 coincides with the receiving position of the received optical beam LA2.

With this arrangement, in the optical atmospheric communication apparatus 1A, in case of receiving the light of optical beam LA2 of the transmitting object 1B, the projecting position of the optical beam LA1 is corrected depending upon the optical beam LA2 and the optical beam LA1 is irradiated with certainty to the transmitting object.

The lens 8 is maintained by a lens holding member 28 and is movable up and down as well as left and right at the actuator 26.

Figure 3:
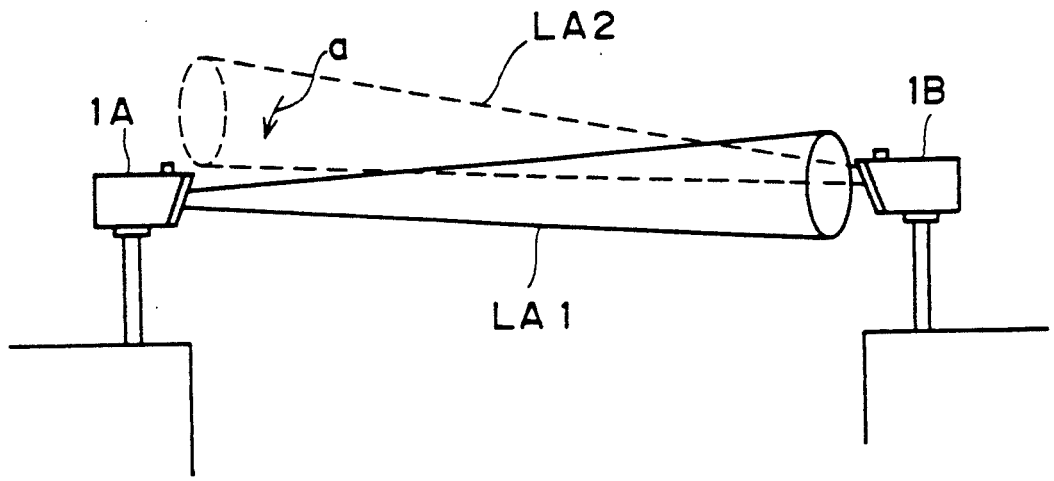
FIG. 3 is a schematic diagram illustrating the operation in a case where one side of the optical beam is off.

Furthermore, as shown in FIG. 3, in the transmitting object side 1B, even in the case where the optical beam LA2 is no longer capable of irradiating to the optical atmospheric communication apparatus 1B, the projecting direction of the optical beam LA2 can be corrected as shown with an arrow a based on the optical beam LA1, thus resetting to the condition wherein optical beams can irradiate reciprocally. Thus the information signal can be certainly transmitted.

Figure 4:
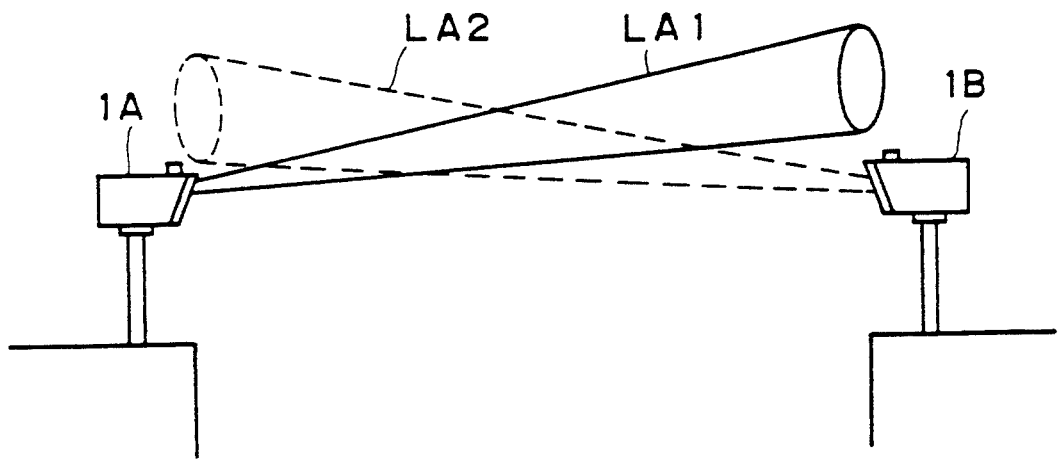
FIG. 4 is a schematic diagram illustrating the operation in a case where both sides of the optical beam are off.

On the other hand, as shown in FIG. 4, in the case where the optical beams LA1 and LA2 are incapable of receiving light reciprocally, the optical atmospheric communication apparatus 1A is shifted from the communication mode to the scanning mode and corrects the projecting direction of the optical beam LA1.

More specifically, if the control circuit 24 detects that the receiving beam LA2 cannot be received depending upon the detected result of the output signal based on the position detecting sensor 20, after suspending the transmission and reception of the information signal, the driving signal EC to be outputted to the actuator 26 is shifted.

Figure 5:
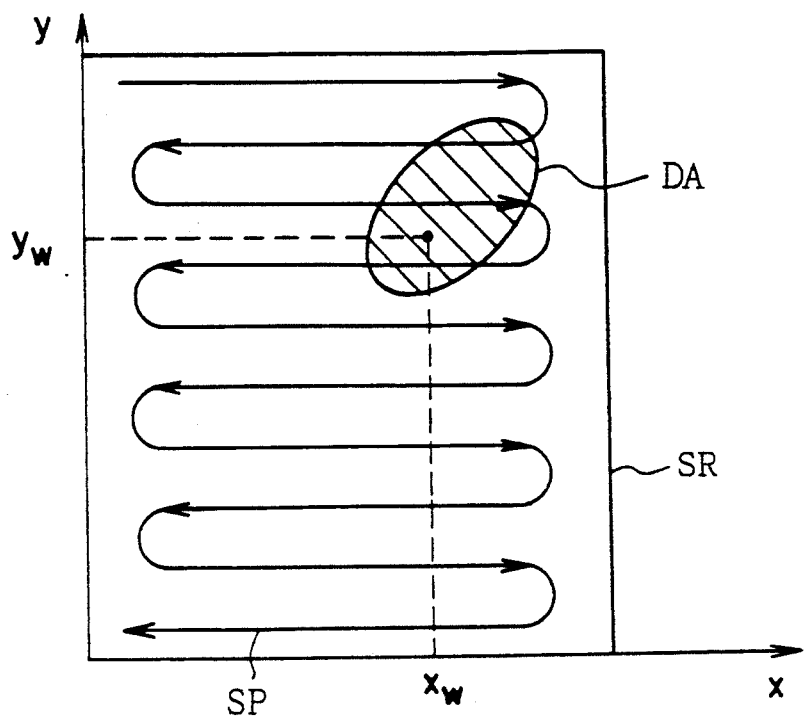
FIG. 5 is a schematic diagram illustrating the operation of beam scanning.

With this arrangement, as shown in FIG. 5, in the control circuit 24, the lens 8 is successively displaced up and down as well as left and right and the projecting position of the optical beam LA1 is scanned in the order of a raster scan along the scanning path SP in the prescribed scanning range SR.

At this point, in the optical atmospheric communication apparatuses 1A and 1B, the corner cube prism 30 is placed on the top and respectively reflects the optical beams LA1 and LA2 arriving from the transmitting objects to the incident direction respectively.

With this arrangement, in the optical atmospheric communication apparatus 1A, in the case where the receiving optical beam LA2 of the transmitting object 1B cannot be received, the position of the transmitting object can be detected by scanning the optical beam LA1 in the prescribed scanning range.

More specifically, the control circuit 24 outputs the quantity of light, when it is shifted to a scan mode, instead of the receiving position of the received optical beam LA2.

The control circuit 24 obtains the quantity of light detection result without a noise element, by eliminating the quantity of light detection result which is smaller than a prescribed threshold value.

Thus, in the control circuit 24, the reflection light of the corner cube prism 30 can be detected in the detecting DA area as shown with slanting lines, and depending on the detected result thereof, the position of the transmitting object can be detected.

Figure 6:
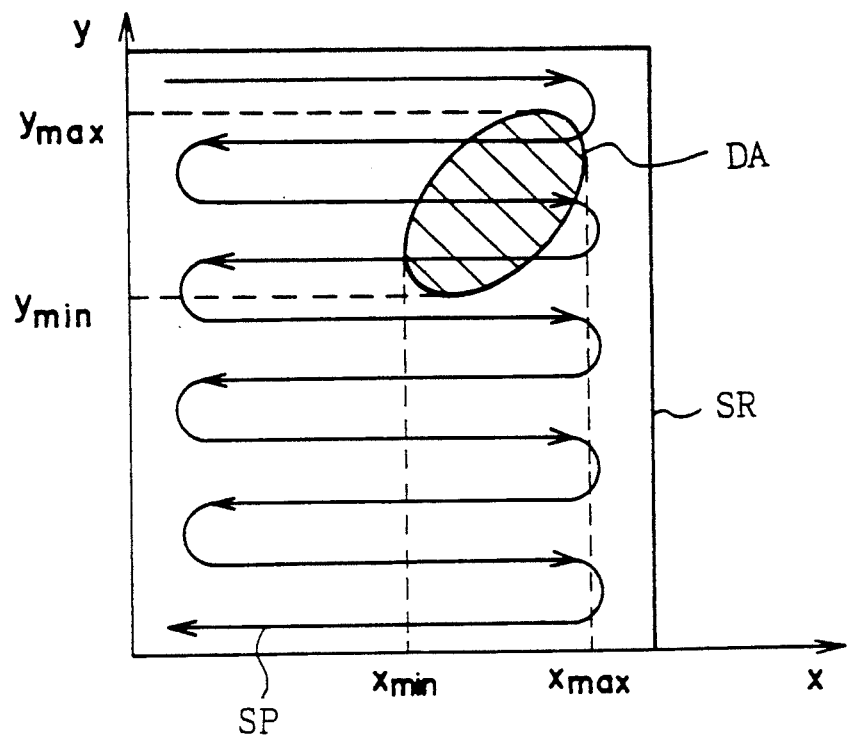
FIG. 6 is a schematic diagram illustrating a case of a detecting the position of transmitting object by mean value.

With the above arrangement, in case of detecting the position of transmitting object as shown in FIG. 6, the maximum values $x_{max}$ and $y_{max}$, and the minimum values $x_{min}$ and $y_{min}$ in the direction of x and y will be detected and according to the mean value obtained, a method for detecting the position of the transmitting object will be considered.

Figure 7:
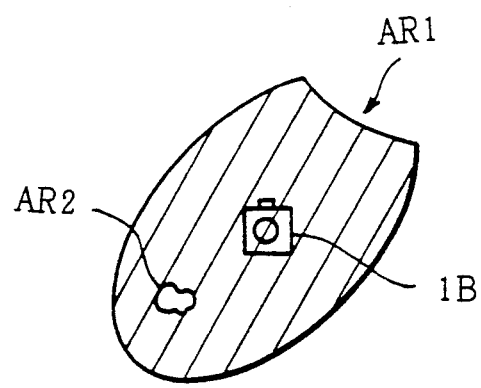
FIG. 7 is a schematic diagram illustrating the barrier for detecting the transmitting object.

However, as shown in FIG. 7, there are cases where a part of the detection area AR1 of reflection light may be missing according to the condition of transmitting pass, are detected.

Also, there are cases where areas are produced in which the reflection light cannot be detected at a central part AR2 of a detection area of reflection light under the influence of dust or the like, may be produced.

Moreover, since the distribution of the light quantity of the optical beam LA1 is not even, if the threshold value is changed, the detection area of the reflection light may be changed.

Thus, in case of detecting the position of a transmitting object according to the mean value, the position of a transmitting object cannot be detected correctly. As a consequence, the projecting position of the optical beam will be corrected centering around the position displaced from the correct position of transmitting object 1B after resetting to the transmission mode. Thus the projecting position of the optical beam LA1 cannot be corrected steadily.

On the other hand, first of all the mean value is detected in the direction x according to the maximum value and minimum value of an x coordinate of said mean value and the mean value in the direction y according to the maximum value and minimum value of a y coordinate of said mean value. By repeating the mean value detection process in the directions x and y, a method for detecting the position of a transmitting object with a simple arithmetic processing operation can be considered.

However, this method also has a negative point in that it cannot detect the correct position of the transmitting object.

Thus, in this embodiment, the control circuit 24 detects the position of a transmitting object by detecting the centroid of a reflection light detection area upon weighting according to the detection result of the light quantity.

More specifically, when detecting the centroids $X_w$ and $Y_w$ of the returning light detection area, upon weighting according to the detection result of the light quantity, where the receiving light quantity is P (x, y), the following equations are obtained:

$$x_w = \frac{\int\int_s xP(x, y)\, dx\, dy}{\int\int_s P(x, y)\, dx\, dy} \quad (1)$$

$$y_w = \frac{\int\int_s yP(x, y)\, dx\, dy}{\int\int_s P(x, y)\, dx\, dy} \quad (2)$$

the arithmetic processing operations of the above may be executed.

On the other hand, since the control circuit 24 comprises the digital signal to be inputted, the detection result of a light quantity discretely, where; the scan range in the direction x and direction y is X and Y respectively, the scan range will be divided into N and the coordinate values x and y will be expressed as follows:

$$x_i = \frac{i}{N} X \quad (3)$$

$$y_j = \frac{j}{N} Y \quad (4)$$

Using the coordinate values x and y, the arithmetic processing operations of the following equations will be executed:

$$x_w = \frac{\sum_{i=0}^{N}\sum_{j=0}^{N} x_i P(x_i, y_j)}{\sum_{i=0}^{N}\sum_{j=0}^{N} P(x_i, y_j)} \quad (5)$$

$$y_w = \frac{\sum_{i=0}^{N}\sum_{j=0}^{N} y_i P(x_i, y_j)}{\sum_{i=0}^{N}\sum_{j=0}^{N} P(x_i, y_j)} \quad (6)$$

With this arrangement, the control circuit 24 detects the centroid of the reflection light detection area upon weighting depending upon the detected result of the light quantity and sets up the detection position at the position of the transmitting object.

Thus, in the case where a part of the reflection light detection area is detected as missing depending upon the transmitting pass condition, or an the area wherein the reflection light is undetectable appears in the reflection light detection area under the influence of dust, and the like, the position of the transmitting object can be detected with certainty by detecting the centroid of the reflection light detection area.

Furthermore, in this event, by detecting the centroid of the reflection light detection area upon weighting based on the detection result of light quantity, even in the case where the distribution of light quantity of the optical beam LA1 is not even, the projecting position of optical beam LA1 can be set at the most appropriate position.

Furthermore, in this event, a threshold value is set up, and by detecting the centroid based on the detection result of light quantity over said threshold value, noise effect can be avoided in advance. Thus, the position of the transmitting object can be detected correctly and the arithmetic processing operations will be simplified accordingly.

Thus, the control circuit 24, after driving an actuator 26 depending on the detected result thereof, is shifted to the communication mode as well as shifting the detection operation to the position detection operation of the receiving optical beam LA2, drives the actuator 26 depending on the detection result.

Moreover, the optical beam LA1 is modulated according to the data signal, after switching the switching circuit 32 toward to the modulator 25, so that transmission and reception of the data signal are started.

According to the above embodiment, a corner cube is deposited separately and a part of the optical beam LA1 to be outputted to the transmitting object 1B is reflected, and the reflected optical beam can be observed with the transmitting object.

Figure 8:
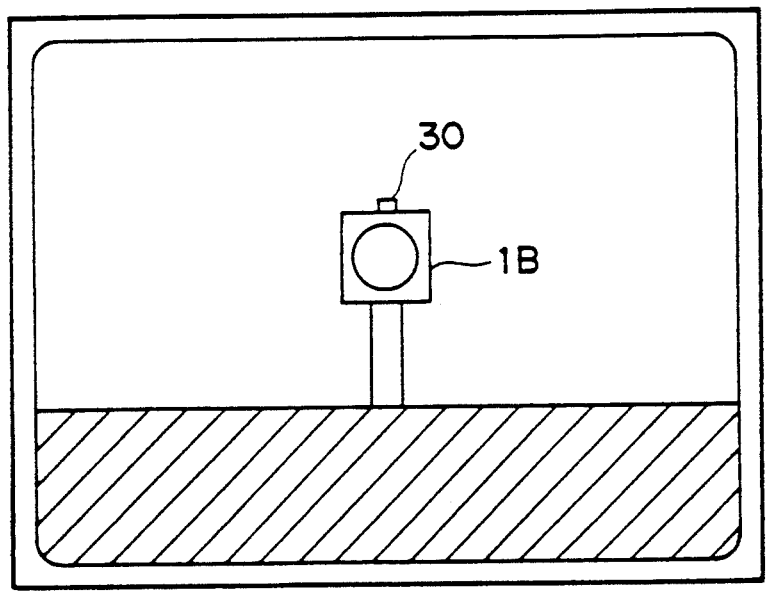
FIG. 8 is a schematic diagram showing an image of the transmitting object.

With this arrangement, as shown in FIG. 8, the projecting positions of the transmitting object 1B and the optical beam LA1 can be recognized via the monitor system. Accordingly, the projecting position adjusting work in setting up can be simplified (U.S. Pat. No. 5,065,455).

Further, in the scanning mode, the control circuit 24 drives the laser driving circuit 23 depending on a scanning modulating signal outputted from the scanning modulating signal forming circuit 27, operating the scanning modulating signal forming circuit 27 as well as switching the switch circuit 32. Here, previously noted, a difference exists between the frequency of the scanning modulating signal and the modulated frequency of the data signal, whereby it may be judged that the detected optical beam is obtained whether by a scanning mode or by a communicating mode, when detecting the optical beam reflected from a transmitting object. In the scanning mode, it previously makes the optical beam to be modulated, whereby it may be judged that an incident optical beam is a reflected beam from the transmitting object or the sun light.

The embodiment discussed above has dealt with the case of detecting the centroid of a reflection light detection area upon weighting depending on the detection result of a quantity of light. However, the present invention is not limited only to the above, but rather the weighting process may be omitted within practically sufficient range.

In this case, the following equation:

$$P(x, y) = \begin{cases} 1 & P(x, y) \geq P_0 \\ 0 & P(x, y) < P_0 \end{cases} \quad (7)$$

as indicated, where the receiving light quantity is larger than the prescribed threshold value $P_o$, the receiving light quantity $P(x_i, y_j)$ is set to the value 1; and where the receiving light quantity is smaller than the threshold value $P_o$, the receiving light quantity $P(x_i, y_j)$ is set to the value 0, and the arithmetic operation process in regard to the equations 5 and 6 may be executed.

Figure 9:
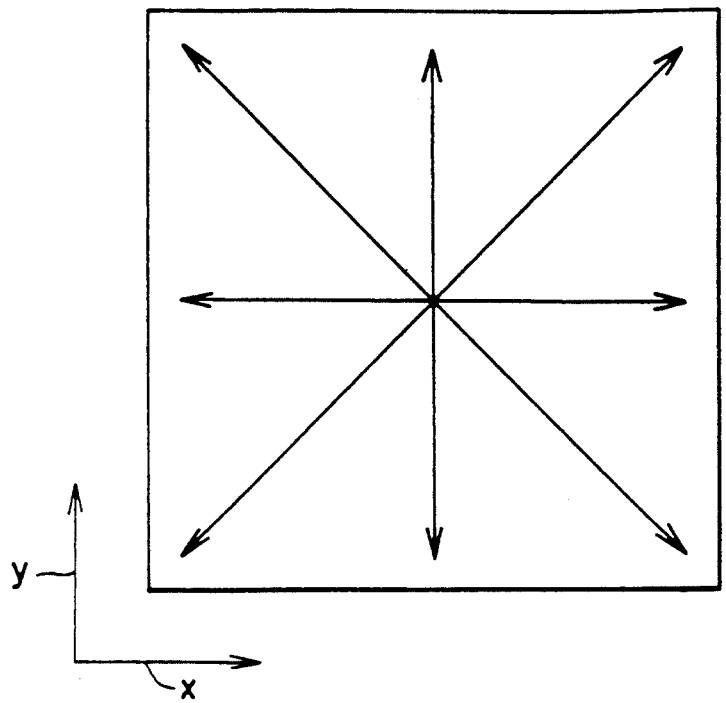
FIG. 9 is a schematic diagram showing a scanning method according to the other embodiment.
Figure 10:
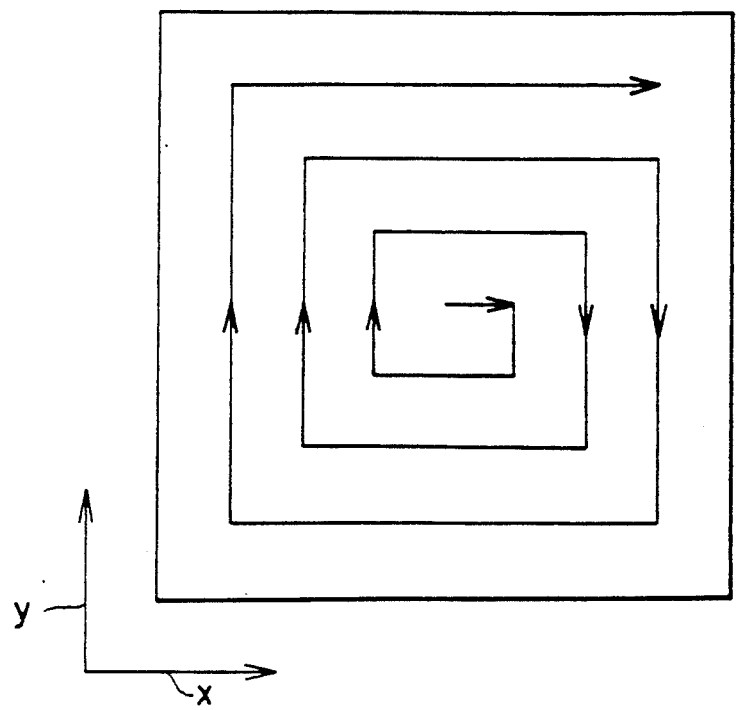
FIG. 10 is a schematic diagram showing a case of vertically scanning the projecting position of the optical beam.

Moreover, the embodiment discussed above has dealt with the case of scanning the optical beam in a raster scanning sequence. However, the present invention is not only limited to the above, but also it is widely applied to a scanning method as shown in FIG. 9 and FIG. 10.

Moreover, the embodiment discussed above has dealt with the case of reflecting the optical beam in utilizing the corner cube prism. The present invention is not, however, limited only to this but the corner cube reflector constituted of a mirror can be widely applied.

Furthermore, the embodiment discussed above has dealt with the case of correcting the projecting position of the optical beam in order that the centroidal position coincides with the projecting position. However, the present invention is not only limited to this but the projecting position of the optical beam may be corrected considering the distance between the corner cube prism and the transmitting object, for example.

Moreover, the embodiment discussed above has dealt with the case of transmitting and receiving the information signal between transmitting objects in both directions. However, the present invention is not only limited to this but also it is widely applicable to the optical atmospheric communication apparatuses equipped with only a transmitting function.

Moreover, in the above embodiments, the control circuit 24 is switched over from the communication mode to the scanning mode, when detecting not to receive the receiving optical beam LA2. The present invention is not, however, limited to this but the switch 29 is executed to "ON", when setting up the optical atmospheric transmission system, in order that a position of a transmission object may be detected by means of switching into the scanning mode.

While there has been described in connection with the preferred embodiments of the invention, it will be apparent to those skilled in the art that various changes and modifications may be made therein without departing from the invention. The invention is aimed, therefore, to cover in the appended claims all such changes and modifications as fall within the true spirit and scope of the invention.

What is claimed is:

1. An optical atmospheric communication apparatus having first and second terminals remotely located from each other for transmitting an optical beam between transmitting means and receiving means having an optical beam reflector for reflecting a received optical beam to an opposite direction, said transmitting means comprising:

light source means for generating an optical beam;
   beam scanning means for scanning the optical beam so as to change the projecting direction of the optical beam;
   means for receiving the optical beam reflected from said optical beam reflector;
   means for detecting a quantity of the optical beam incident to said receiving means in each projecting direction; and
   means for determining a suitable projecting direction of the optical beam in accordance with an output signal of said detecting means, in which said determining means determine the suitable projecting direction by a following function, $$X_w = \frac{\int\int_s xP(x, y) \, dx \, dy}{\int\int_s xP(x, y) \, dx \, dy} \quad (1)$$

$$Y_w = \frac{\int\int_s yP(x, y) \, dx \, dy}{\int\int_s P(x, y) \, dx \, dy} \quad (2)$$

(here, $X_w$, $Y_w$) is a centroid and $P(x, y)$ is an optical quantity of the received light beam).

2. The optical atmospheric communication apparatus according to claim 1, wherein said determining means executes said equations (1) and (2), as $$P(x, y) = 0$$

when $$P(x, y) < P_0$$

(where here, $P_0$ is a threshold value).

3. The optical atmospheric communication apparatus according to claim 2, wherein said determining means executes said equations (1) and (2), as $$P(x, y) = 1$$

when $$P(x, y) \geq P_0$$

4. The optical atmospheric communication apparatus according to claim 1, further comprising:
   means for adjusting the projecting direction of the optical beam to a suitable projecting direction.

* * * * *